US009811955B2

(12) United States Patent
Russell et al.

(10) Patent No.: US 9,811,955 B2
(45) Date of Patent: Nov. 7, 2017

(54) WEARABLE RFID DEVICES WITH MANUALLY ACTIVATED RFID TAGS

(71) Applicant: Amazon Technologies, Inc., Reno, NV (US)

(72) Inventors: Ryan Scott Russell, Bellevue, WA (US); Wesley Scott Lauka, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 135 days.

(21) Appl. No.: 14/314,553

(22) Filed: Jun. 25, 2014

(65) Prior Publication Data
US 2015/0379791 A1    Dec. 31, 2015

(51) Int. Cl.
*G06K 7/00* (2006.01)
*G07C 9/00* (2006.01)
*G06Q 10/08* (2012.01)
*G06K 7/10* (2006.01)
*G06Q 50/04* (2012.01)
*G06Q 50/28* (2012.01)
*G06Q 90/00* (2006.01)
*G06K 19/077* (2006.01)
*G06K 19/07* (2006.01)

(52) U.S. Cl.
CPC ..... *G07C 9/00031* (2013.01); *G06K 7/10396* (2013.01); *G06K 19/0716* (2013.01); *G06K 19/07762* (2013.01); *G06Q 10/08* (2013.01); *G06Q 50/04* (2013.01); *G06Q 50/28* (2013.01); *G06Q 90/00* (2013.01); *Y02P 90/30* (2015.11)

(58) Field of Classification Search
CPC .... G07C 9/00031; G06Q 10/08; G06Q 50/28; G06Q 90/00; G06Q 50/04; G06K 7/10396; G06K 19/0716; G06K 19/07762
USPC .................................. 340/5.61, 12.51, 13.26
See application file for complete search history.

(56) References Cited

U.S. PATENT DOCUMENTS 5,099,977 A    3/1992   Hirose et al.
6,366,242 B1   4/2002   Boyd et al.
(Continued)

FOREIGN PATENT DOCUMENTS

WO       2014093968 A1    6/2014

OTHER PUBLICATIONS

"A Capacitive Touch Interface for Passive RFID Tags," Sample, A.P., Yeager, D.J., and Smith, J.R. 2009 IEEE International Conference on RFID, pp. 103-109.
(Continued)

*Primary Examiner* — Thomas Alunkal
(74) *Attorney, Agent, or Firm* — Athorus, PLLC

(57) ABSTRACT

A wearable RFID device may include one or more manually activated RFID tags configured to transmit unique RFID signals in response to a manual activation thereof. Such wearable RFID devices may be worn about any aspect of a user's body, such as a hand, a wrist or an arm of the user, who may contact the manually activated RFID tag and transmit an RFID signal that is consistent with a particular action or instruction associated with a task. The action or the instruction may be executed based on the RFID signal, or upon receiving a confluence or sequence of RFID signals. Additionally, a wearable RFID device may be recognized by one or more discrete systems and configured to operate such systems accordingly.

15 Claims, 10 Drawing Sheets

(56) References Cited

U.S. PATENT DOCUMENTS

| | | | |
|---|---|---|---|
| 6,531,964 B1* | 3/2003 | Loving | G06K 7/10881 340/10.1 |
| 8,169,303 B2 | 5/2012 | Hanebeck | |
| 8,482,412 B2* | 7/2013 | Majoros | G06K 7/0008 340/10.1 |
| 8,542,834 B1 | 9/2013 | Feikis et al. | |
| 8,556,178 B2 | 10/2013 | Wang et al. | |
| 8,893,969 B2 | 11/2014 | Brandl | |
| 9,405,948 B2 | 8/2016 | Schwiers et al. | |
| 2002/0067264 A1 | 6/2002 | Soehnlen | |
| 2002/0185542 A1* | 12/2002 | Wilz, Sr. | G06K 7/10693 235/462.46 |
| 2003/0075608 A1 | 4/2003 | Atherton | |
| 2003/0136635 A1 | 7/2003 | Lauch | |
| 2003/0189493 A1 | 10/2003 | Klausner et al. | |
| 2004/0066296 A1 | 4/2004 | Atherton | |
| 2004/0118916 A1 | 6/2004 | He | |
| 2004/0119605 A1 | 6/2004 | Schaper | |
| 2005/0183990 A1 | 8/2005 | Corbett | |
| 2005/0200476 A1 | 9/2005 | Forr et al. | |
| 2005/0203798 A1 | 9/2005 | Jensen et al. | |
| 2005/0234774 A1 | 10/2005 | Dupree | |
| 2005/0243784 A1 | 11/2005 | Fitzgerald et al. | |
| 2005/0284941 A1 | 12/2005 | Lubow | |
| 2006/0044110 A1 | 3/2006 | Napolitano | |
| 2006/0119481 A1 | 6/2006 | Tethrake et al. | |
| 2006/0145880 A1 | 7/2006 | Chi et al. | |
| 2006/0186201 A1 | 8/2006 | Hart | |
| 2006/0187061 A1 | 8/2006 | Colby | |
| 2006/0284839 A1 | 12/2006 | Breed et al. | |
| 2007/0018832 A1* | 1/2007 | Beigel | G06K 19/07345 340/572.7 |
| 2007/0021197 A1 | 1/2007 | Frerking | |
| 2007/0030151 A1 | 2/2007 | Morrow | |
| 2007/0057469 A1 | 3/2007 | Grauzer et al. | |
| 2007/0075148 A1 | 4/2007 | Usami | |
| 2007/0075861 A1 | 4/2007 | Cook et al. | |
| 2007/0096906 A1 | 5/2007 | Lyons et al. | |
| 2007/0109101 A1 | 5/2007 | Colby | |
| 2007/0126578 A1 | 6/2007 | Broussard | |
| 2007/0136218 A1 | 6/2007 | Bauer et al. | |
| 2007/0152829 A1 | 7/2007 | Lindsay et al. | |
| 2007/0164863 A1 | 7/2007 | Himberger et al. | |
| 2007/0175972 A1* | 8/2007 | Ringer | G07F 7/10 235/3 |
| 2007/0296599 A1 | 12/2007 | Wang et al. | |
| 2008/0093176 A1 | 4/2008 | Rosenthal | |
| 2008/0113767 A1 | 5/2008 | Nguyen et al. | |
| 2008/0185265 A1 | 8/2008 | Alemany et al. | |
| 2008/0297324 A1 | 12/2008 | Tuttle | |
| 2009/0033463 A1* | 2/2009 | Posamentier | G06K 19/0723 340/10.1 |
| 2009/0085721 A1* | 4/2009 | Dishongh | H04Q 9/00 340/10.1 |
| 2009/0167699 A1 | 7/2009 | Rosenblatt et al. | |
| 2009/0309086 A1 | 12/2009 | Behan et al. | |
| 2010/0063652 A1* | 3/2010 | Anderson | A61B 5/02438 701/2 |
| 2010/0097195 A1 | 4/2010 | Majoros et al. | |
| 2010/0114426 A1* | 5/2010 | Boss | G06Q 10/06 701/33.4 |
| 2010/0123581 A1* | 5/2010 | Hatfield | G06K 19/07345 340/572.3 |
| 2010/0171592 A1 | 7/2010 | Kamemaru | |
| 2010/0177993 A1 | 7/2010 | Chen | |
| 2010/0271187 A1* | 10/2010 | Uysal | G06K 7/0008 340/10.4 |
| 2010/0308964 A1 | 12/2010 | Ackley et al. | |
| 2010/0308975 A1 | 12/2010 | Gregersen et al. | |
| 2011/0163850 A1 | 7/2011 | Bachman et al. | |
| 2011/0227748 A1 | 9/2011 | Schaible et al. | |
| 2011/0266342 A1 | 11/2011 | Forster | |
| 2011/0285507 A1 | 11/2011 | Nelson | |
| 2012/0299703 A1 | 11/2012 | Chen | |
| 2013/0314207 A1 | 11/2013 | Yonekura et al. | |
| 2013/0342349 A1 | 12/2013 | Cruz | |
| 2014/0002113 A1 | 1/2014 | Schediwy et al. | |
| 2014/0012161 A1 | 1/2014 | Ross | |
| 2014/0061303 A1 | 3/2014 | Brandl | |
| 2014/0061382 A1 | 3/2014 | Tucker | |
| 2014/0111333 A1 | 4/2014 | Haas | |
| 2014/0121903 A1 | 5/2014 | Lee | |
| 2014/0148988 A1 | 5/2014 | Lathrop et al. | |
| 2014/0176307 A1 | 6/2014 | Forster | |
| 2014/0186219 A1 | 7/2014 | Yukimoto | |
| 2014/0232519 A1 | 8/2014 | Allen et al. | |
| 2015/0357948 A1* | 12/2015 | Goldstein | G05D 7/0676 318/16 |
| 2015/0360567 A1 | 12/2015 | Sannomiya et al. | |

OTHER PUBLICATIONS

International Search Report and Written Opinion of PCT Application No. PCT/US2015/037287 with a mailing date of Sep. 30, 2015.
International Search Report and Written Opinion of PCT Application No. PCT/U52015/056779 with a mailing date of Jan. 19, 2016.
International Search Report of International Application No. PCT/US2015/037531 dated Sep. 25, 2015.

* cited by examiner

WEARABLE RFID DEVICES WITH MANUALLY ACTIVATED RFID TAGS

BACKGROUND

Many systems, components, appliances or other like machines that are configured to operate based on user inputs may include one or more devices, which are commonly called "remote controls," which enable users to provide signals, instructions or commands to such machines from a distance. A remote control may be electronically linked by a wired or wireless means to a system, a component or an appliance, or another like machine, and may provide a user with operational flexibility when using such a machine. With a properly programmed or configured remote control, a user may cause a garage door to open or close, change a slide on an electronic presentation, raise a volume level on a radio or television set, or perform any other desired function relating to the operation of any type of machine with which the remote control may be associated.

Existing remote controls have limited functionality, however. For example, a remote control that is wired to a machine may have a functional range that is defined by a length of its wired connection, which inherently limits the variety or discretion that a user may exercise when operating the machine. A remote control that is wirelessly tethered to a machine, e.g., by the transmission and receipt of infrared signals, may provide greater flexibility to a user of the machine, but typically requires an unobstructed line of sight between the remote control and the machine in order to function properly. Moreover, both wired and wireless remote controls typically must obtain electrical power from some extrinsic source. For example, a remote control that is wired to a machine typically receives the electrical power that is required for operation from the machine, while a wireless remote control usually includes some form of battery that enables the remote control to operate on electrical power regardless of its location with respect to a machine.

Furthermore, existing remote controls must typically be pre-configured or pre-programmed in order to perform a particular function. Once such controls are so configured or programmed, the operation of the controls is limited to that particular function. For example, a wireless mouse or keyboard must be electronically linked with a computer device or computer display prior to operation. Similarly, a "smart" remote control that is capable of controlling the operation of multiple multimedia devices at once (e.g., a television, a home theater system, a cable television converter box or a digital video recorder) must also be individually programmed to operate each of such devices, and must be reconfigured or reprogrammed if one of such devices is removed or replaced.

Moreover, a typical remote control device is generally incapable of distinguishing between users, or identifying users thereof. For example, any viewer of a movie or other program shown on a television or other display may operate a remote control thereof, and such viewers commonly clamor for the right to do so. Likewise, where a home security system includes a keypad or other remote control platform from which the system may be activated, deactivated or otherwise configured, the keypad or platform permits multiple family members to control or operate the system thereby, so long as the respective family members know and successfully enter a security code at the keypad or platform.

DETAILED DESCRIPTION

As is set forth in greater detail below, the present disclosure is directed to the use of wearable radio frequency identification (or "RFID") devices for the remote operation of one or more systems, components, appliances or other like machines. Specifically, the systems and methods disclosed herein are directed to providing an apparatus, e.g., an article of clothing, which includes one or more manually activated RFID tags (e.g., transmitters or other transmitting devices) and may be worn by a user. Some of the devices disclosed herein may be worn about a hand, a wrist, an arm, a leg, a head or another body part or extension of a user, and may include one or more manually activated RFID devices that may cause RFID signals to be transmitted to an RFID reader upon contact. Once the RFID reader captures an RFID signal that has been transmitted by a wearable RFID device, the RFID reader may cause one or more relevant actions or steps to be taken in response in accordance with the present disclosure, such as by transmitting information regarding the RFID signal or the wearable RFID device to an external server or other computer device.

Moreover, the RFID reader may be configured to capture other RFID signals transmitted by non-manually activated RFID tags that may be nearby, e.g., simultaneously or nearly simultaneously with an RFID signal transmitted by a manually activated RFID tag associated with a wearable RFID device. The non-manually activated RFID tags may be associated with any objects, humans, machines or structures, including but not limited to a user of the wearable RFID device, as well as a system, a component, an appliance or another like machine with which the wearable RFID device is associated. Thus, in accordance with the present disclosure, an RFID reader may be configured to receive and recognize a confluence of RFID signals, or a sequence of RFID signals or confluences of RFID signals, including RFID signals transmitted from one or more manually activated RFID tags that are included in, mounted to or otherwise associated with a wearable RFID device. Upon receiving and recognizing a confluence, or a sequence of signals or confluences, the RFID reader may provide information regarding the signals, the confluences and/or the sequences to an external server or other computer device, which may perform one or more associated actions, or cause such actions to be performed hereby.

Figure 1A:
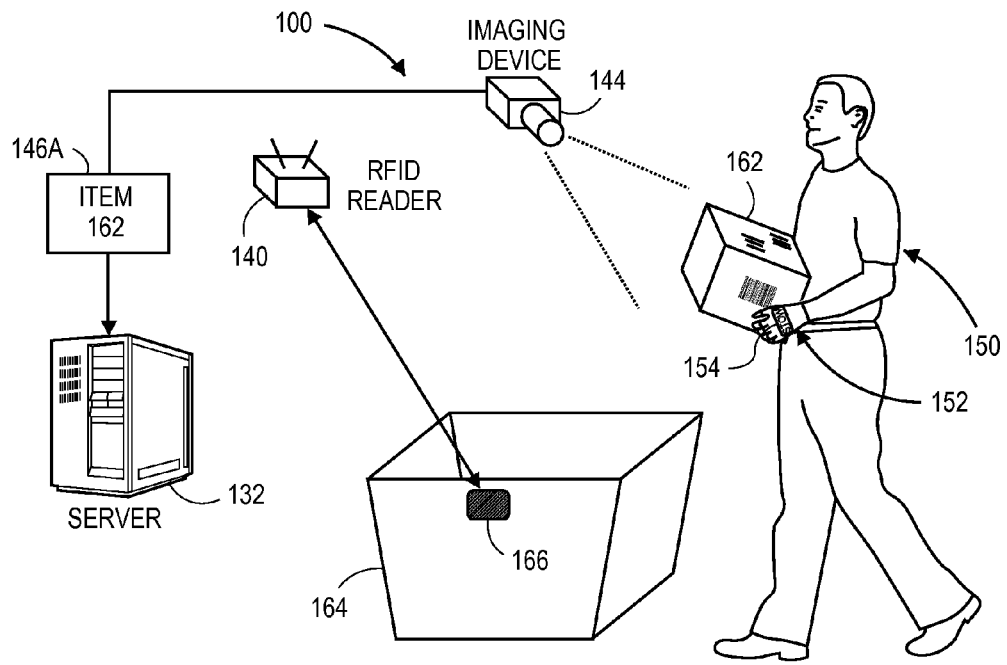
FIGS. 1A, 1B and 1C are views of one system including a wearable RFID device in accordance with embodiments of the present disclosure.
Figure 1B:
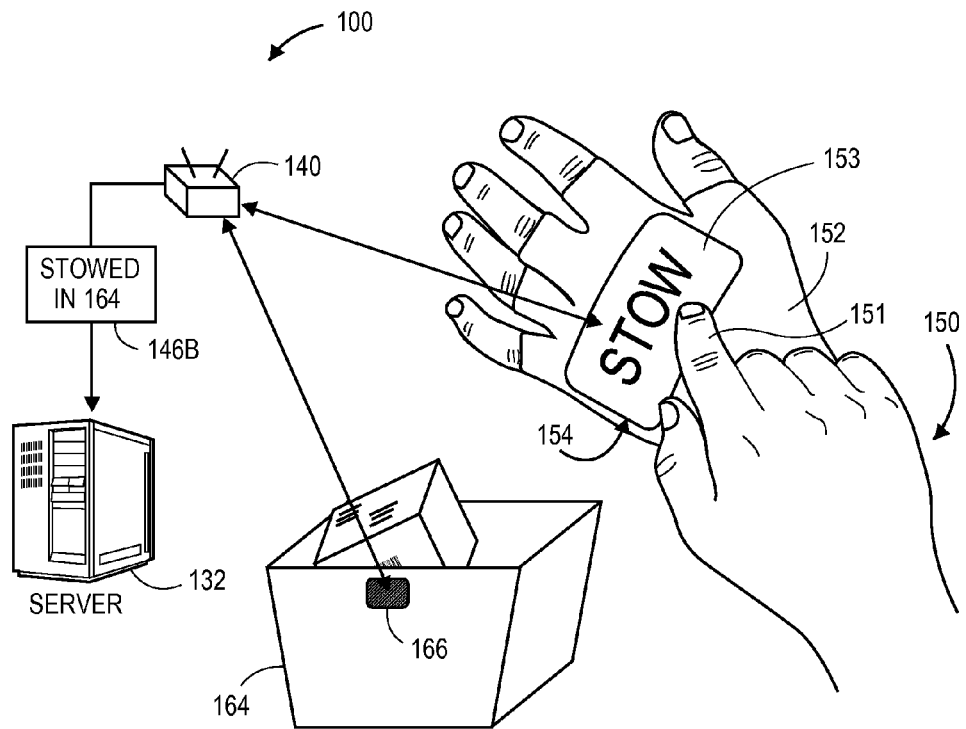
Figure 1C:
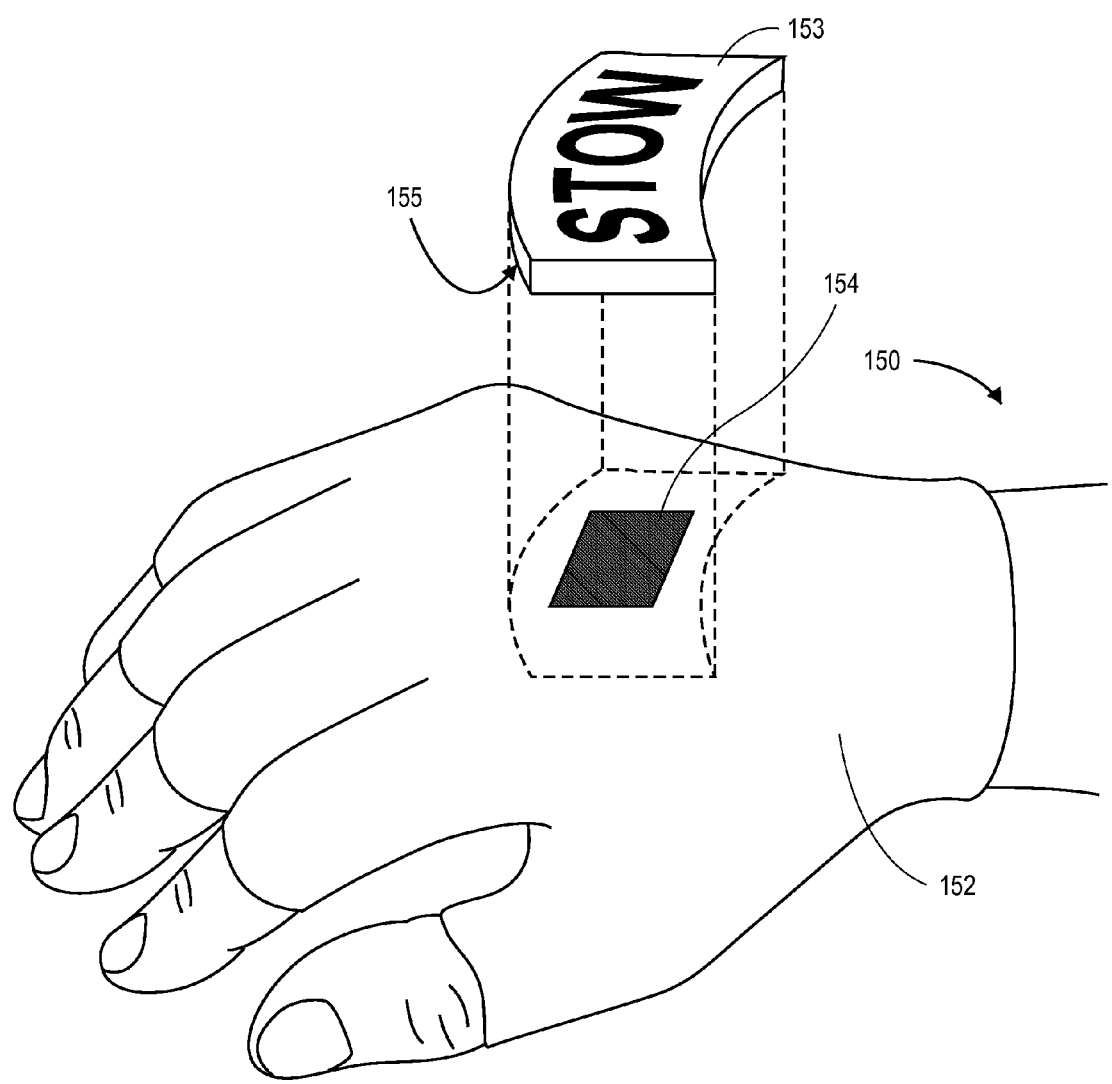

Referring to FIGS. 1A, 1B and 1C, a system 100 including a worker 150 wearing a wearable RFID device 152 in accordance with the present disclosure is shown. The system 100 includes a server 132, an RFID reader 140, an imaging device 144 and a storage facility 164 (viz., a bin) having a passive RFID device 166 mounted thereto. The worker 150 is preparing to deposit an item 162 into the storage facility 164, and is wearing the wearable RFID device 152 about a hand or wrist. A manually activated RFID tag 154 is provided beneath a protective layer 153 bearing descriptive or otherwise relevant text thereon and is disposed on a posterior or dorsal side of the wearable RFID device 152.

As is shown in FIG. 1A, the RFID reader 140 is configured to receive one or more RFID signals from any type or form of RFID device, tag or transmitter in a vicinity thereof. For example, as is shown in FIG. 1A, the RFID reader 140 is configured to receive an RFID signal from the passive RFID device 166 mounted to the storage facility 164. Similarly, the imaging device 144 is configured to capture one or more images, e.g., images of aspects of the item 162 and any associated markings or other identifiers thereon, and transfer information 146A regarding such images, such markings or such identifiers to the server 132. For example, as is shown in FIG. 1A, the information 146A includes an identification of the item 162, as determined through an analysis of imaging data captured by the imaging device 144, to the server 132.

In accordance with the present disclosure, an RFID signal transmitted by one or more tags, transmitters or other components of a wearable RFID device may be received at an RFID reader, and information regarding the RFID signal may be provided to an external server, e.g., from the RFID reader 140 of the system 100, thereby. Referring to FIG. 1B, the system 100 of FIG. 1A is shown, with the worker 150 contacting the protective layer 153 on the wearable RFID device 152 in a vicinity of the manually activated RFID tag 154 using a finger 151. Referring to FIG. 1C, the wearable RFID device 152 includes an alphanumeric or lexicographic marking or text-based identifier (viz., "STOW") on a touch-sensing button defined by the protective layer 153 associated with the manually activated RFID tag 154. Upon contact with the protective layer 153 by the worker 150, an RFID signal is transmitted from the manually activated RFID tag 154 to the RFID reader 140, which may further transmit information 146B regarding the RFID signal, the worker 150, the wearable RFID device 152 or the item 162 to the server 132. The information 146B transmitted from the RFID reader 140 to the server 132 may identify an action taken by the worker 150, viz., depositing the item 162 into the storage facility 164, or include any other information or data of relevance.

Accordingly, as is shown in FIGS. 1A, 1B and 1C, the systems and methods of the present disclosure may identify, acknowledge and recognize actions taken by one or more users of wearable RFID devices including one or more manually activated RFID tags. The systems and methods disclosed herein may operate based on signals received at one or more RFID readers from such wearable RFID devices and/or from any other RFID tags, transmitters or devices in a vicinity thereof, and may capture and store information regarding such signals, or from the devices from which such signals were transmitted or the users of such devices in one or more data stores. The wearable RFID devices of the present disclosure may be worn about any portion or aspect of a user's body, including but not limited to portions of his or her hands, wrists or arms. The RFID signals transmitted by such devices or the information associated with such signals may be used to take one or more specific actions, e.g., in response to commands issued by a server or other computer device to a networked component upon receiving such signals, or to review, record or audit one or more physical and virtual transactions involving any objects, humans, machines or structures.

RFID refers to a wireless, non-contacting system for transferring data by way of radio frequency electromagnetic fields. In an RFID system, data transfers occur in the form of modulated signals transmitted between an RFID tag (or an RFID device), which may include various communication components, logic or circuitry, and an RFID reader, which may include antennas or other like devices. Data stored within a microchip or other storage device associated with the RFID tag may be sent to the RFID reader, which may interpret not only the data received in the RFID signal but also other relevant information or attributes of the RFID signal, such as an intensity or a frequency of the RFID signal, as well as a direction from which the RFID signal originated, a range traveled by the RFID signal or at least some of the information or data included in the RFID signal. The transfer of the RFID signal is initiated when an electric field or a magnetic field transmitted by an RFID reader is sensed by an RFID tag, which transmits information or data that may be stored in association with the RFID tag in one or more microchips or other storage devices.

RFID systems provide a number of advantages over similar systems for the short-range transfer of information or data. First, an RFID tag may be formed of components having remarkably small, compact shapes and sizes, and tags that are as thin as a sheet of paper or smaller than a grain of rice are quite common. Additionally, unlike a bar code (e.g., a one-dimensional bar code or a two-dimensional "QR" code), an RFID tag need not be provided within a line of sight of an RFID reader in order to successfully transmit data. Therefore, RFID tags may be concealed or embedded into many different types of objects of any size or shape, as well as humans or other animals. Next, an RFID tag may be programmed with a fixed set or packet of "read-only" data which may be transmitted to an RFID reader countless number of times in theory, or reprogrammed with modifiable sets of data that may be written and rewritten, as needed, based on the application in which the RFID tag is provided. Moreover, and perhaps most importantly, while an active RFID tag includes and utilizes a local power source, such as a battery, a passive RFID tag does not require any power in order to successfully transmit a set or packet of data to an RFID reader, and may therefore transmit such data when power supplies are unavailable or in environments where providing power to the RFID tag is infeasible.

RFID signals may be transmitted from an RFID tag to an RFID reader in many different formats and at many different frequency levels. An RFID tag that transmits signals within low frequency (LF), medium frequency (MF) or high frequency (HF) levels (e.g., approximately 3 kilohertz to 30 megahertz, or 3 kHz-30 MHz) may transfer relatively small-sized sets or packets of data over short ranges (e.g., between ten and one hundred centimeters, or 10-100 cm). Other RFID tags may transmit signals at higher frequency levels, such as ultrahigh frequency (UHF) or microwave levels (e.g., approximately 300 megahertz to 300 gigahertz, or 300 MHz-300 GHz) including larger sets or packets of data at ranges of one meter (1 m) or longer.

A signal transmission from an RFID tag to an RFID reader may be achieved in any number of ways. An inductively coupled RFID tag is an RFID tag that is powered by energy obtained from magnetic fields generated by an RFID reader, and may be coupled to the RFID reader using this energy. In this regard, an RFID reader may include one or more coils through which an electric current may pass, thereby causing a magnetic field to be generated by the RFID reader according to Ampere's Law. Likewise, an inductively coupled RFID tag may also include one or more coils. When the RFID tag passes within a particular range of the RFID reader, an electric current is generated within the coils of the RFID tag, thereby coupling the RFID reader and the RFID tag based on the magnetic flux passing through the respective sets of coils. The electric current passing through the coils of the RFID tag may then power internal circuits within the RFID tag, and cause an RFID signal to be transmitted from the RFID tag to the RFID reader accordingly. Thus, inductively coupled RFID tags are commonly used in powerless environments where a passive system for transmitting signals may be required.

Additionally, an RFID tag may be coupled by any number of other modes. For example, capacitively coupled RFID tags include coupling plates that are designed to correspond to a plate of an RFID reader. When the RFID tag is placed in sufficiently close proximity to the RFID reader, thereby causing the corresponding coupling plates of the RFID tag and the RFID reader to be aligned in parallel with one another and within a short range, a transfer of data from the RFID tag to the RFID reader is achieved. Unlike an inductively coupled RFID tag, which is powered by a magnetic field generated by an RFID reader, a capacitively coupled RFID tag is powered by an alternating electric field generated by an RFID reader. For this reason, capacitively coupled RFID tags usually have more limited operating ranges than inductively coupled RFID tags and are typically employed in near-field communication environments. Similarly, a backscatter-coupled RFID tag receives power emitted from an RFID reader's antenna. A portion of the emissions from the RFID reader are received by a corresponding antenna of the RFID tag and may be filtered or rectified, as necessary, in order to trigger a transfer of data from the RFID tag to the RFID reader. Any type or mode of coupling between an active, semi-active (e.g., powered on a temporary basis or for limited purposes) or passive RFID tag and an RFID reader may be utilized in accordance with the present disclosure.

In addition to RFID tags which are automatically coupled with an RFID reader, the systems and methods of the present disclosure may further include an RFID tag, such as a passive RFID tag, which may be manually activated, e.g., coupled upon a manual action, by a human or machine in order to cause a transmission of a data signal from the RFID tag to one or more RFID readers. A manually activated RFID tag may include physical or virtual switches that may close a circuit within the RFID tag and thereby permit the RFID tag to function as a data transmitter in the presence of an electric or magnetic field. For example, a manually activated RFID tag may include capacitive elements that define a capacitor within the RFID tag, and may effectively close a circuit within the RFID tag when such elements detect bioelectricity from a user. The term "bioelectricity" generally refers to electrical charges or electric field gradients that may be stored within a living body, such as a human body, which contains blood and other matter having a variety of positively and negatively charged ions (e.g., sodium, chloride and others). Bioelectricity within a body may cause a change in capacitance of such elements in a vicinity of a location touched by the body (e.g., a digit such as a finger or thumb), due to disruptions in electrical fields caused by the body's presence, thereby further causing a change in the time constant of the RFID tag, and a discharge of the capacitor in an amount that may be defined as a function of the resistance of the capacitive elements.

According to some embodiments, such capacitive elements may be formed into a layered stack or may include a substantially linear or planar gap or break, and may be covered with a flexible protective layer formed from one or more plastics or rubbers (e.g., acrylics, vinyls, polyurethanes or the like), or other like materials. The protective layer may be adhered to one or more capacitive elements of an RFID circuit, which may include elements formed from a conductive material such as aluminum, copper, silicon or indium tin oxide that are separated by an air gap. When a user touches a protective layer of an RFID tag with a finger, which is a bioelectric conductor, a change in the effective capacitance (on the order of approximately one picofarad) between the elements, which are also conductors, in a vicinity of a point or points of contact with the protective layer is introduced. Such contact forms a conductive bridge across the elements, thereby causing disruptions in electrical fields in the vicinity of one or more of the elements, and further causing an internal current flow through the RFID tag circuit.

In addition to capacitive elements, a circuit of an RFID tag may include other components for enabling a manual actuation thereof by a human or a machine, including one or more substantially planar conductive elements that may be separated by an air gap. Such an air gap between the conductive elements defines an open switch within the circuit of the RFID tag, which may also be covered with a flexible protective layer that may be formed from one or more plastics, rubbers or other like materials. When a user contacts an external surface of the RFID tag corresponding to the air gap, e.g., the flexible protective layer over the air gap, at least two of the conductive elements are placed in contact with one another, thereby bridging the air gap between the conductive elements and closing the open switch. Subsequently, an internal current flow through the RFID tag circuit is enabled. Because the bridging of the air gap and the closure of the open switch is registered by manually driven electrical contact, a manually activated RFID tag including substantially planar conductive elements does not require bioelectricity in order to operate properly, and a user may interact with the RFID tag using not only his or her fingers or hands (which may be gloved or ungloved) but also a stylus, a pointer or another like object.

The systems and methods of the present disclosure are directed to wearable apparatuses including one or RFID tags, transmitters or other devices that may be manually activated in order to cause one or more RFID signals to be transmitted to an RFID reader within an applicable range. Specifically, the systems and methods of the present disclosure may be configured to receive one or more RFID signals, including at least one RFID signal transmitted by a manually activated RFID tag in response to contact with a touch-sensing button or other like element of a wearable RFID device, and to take one or more relevant actions in response to such signals. In some embodiments, the wearable RFID devices disclosed herein may take the form of one or more glove-like or bracelet-like articles of clothing that may have one or more manually activated RFID tags embedded or otherwise incorporated therein.

Thus, the present disclosure describes wearable RFID signal transmitters that may be controlled by a user for use in any number of diverse applications in order to control the performance of a variety of functions without requiring any form of extrinsic power supply, e.g., from an alternating current (AC) or a direct current (DC) source. Because an RFID tag may be configured to transmit a unique data signal to an RFID reader, and may be powered from the same electric or magnetic field by which the unique data signal may be transmitted, the wearable RFID devices disclosed herein may be used in any number of applications to transmit such data signals in a powerless environment, and in the absence of contact between a transmitter and a receiver. Moreover, because an RFID tag, transmitter or other device may be formed from components of a limited size, such tags, transmitters or devices may be incorporated into articles of clothing and worn on a human body.

The wearable RFID devices of the present disclosure may be operated by a user to transmit a unique RFID signal for the purpose of performing any relevant function. For example, a user may operate a wearable RFID device to confirm his or her performance of a given task, e.g., by contacting a portion of the wearable RFID device such as a touch-sensing button, which results in the transmission of a unique RFID signal from a manually activated RFID tag embedded therein to an RFID reader. Additionally, the RFID signals transmitted by the wearable RFID devices of the present disclosure may be considered in concert with RFID signals transmitted by other manually activated and non-manually activated RFID tags in a vicinity of the RFID reader. Thus, a confluence of such signals may therefore be received and associated with the performance of the given task. Accordingly, an RFID reader which receives an RFID signal from a wearable RFID device, alone or in concert with RFID signals from one or more other RFID devices, may transmit information regarding such signals to an external server or other networked component or computer device that may perform a designated function based on such information.

For example, the systems and methods of the present disclosure may be utilized to identify and authenticate a person attempting to unlock a door or otherwise enter a secure facility based on a signal received from a non-manually activated RFID tag associated with that person, and permit that person to unlock the door or enter the facility upon receiving a signal from a manually activated RFID tag included in a wearable RFID device operated by that person. Similarly, the systems and methods of the present disclosure may recognize a worker by any means, e.g., based on a log-in and authentication to a computer system by the worker, an analysis of one or more images of the worker by facial recognition algorithms or techniques, or an RFID signal received from a non-manually activated RFID tag associated with the person (e.g., an identification badge or like device), and may register a transaction associated with the worker in response to an RFID signal received from a manually activated RFID tag embedded within or associated with a wearable RFID device of the present disclosure.

Furthermore, various systems, components, appliances or other like machines may be individually configured to interpret unique RFID signals transmitted by the wearable RFID devices disclosed herein in different ways. Therefore, in accordance with the present disclosure, the same wearable RFID device including one or more discrete manually activated RFID tags may be operated by a user to transmit the same RFID signals to one or more RFID readers, and such signals may be interpreted by different systems, components, applications or machines in order to perform one or more independent functions.

For example, an RFID signal associated with a call for assistance that is transmitted by a manually activated RFID tag on a wearable RFID device, e.g., where the wearable RFID device includes a touch-sensing button that is associated with a manually activated RFID tag and reads "HELP," may trigger different responses when the RFID signal is received by an RFID reader in a department store, in a hospital or in a parking lot. Similarly, an RFID signal that is associated with powering a device on, e.g., where the wearable RFID device includes a touch-sensing button that is associated with a manually activated RFID tag and reads "ON," may cause a computer, a toaster oven, or an electric light to be turned on. Additionally, where a wearable RFID device includes one or more touch-sensing buttons corresponding to directional arrows (e.g., up, down, left and/or right) or other like actions, RFID signals received from manually activated RFID tags by an RFID reader in response to contact with such touch-sensing buttons may cause a cursor on a computer display, a garage door or a rotating tie rack to translate accordingly.

Figure 2:
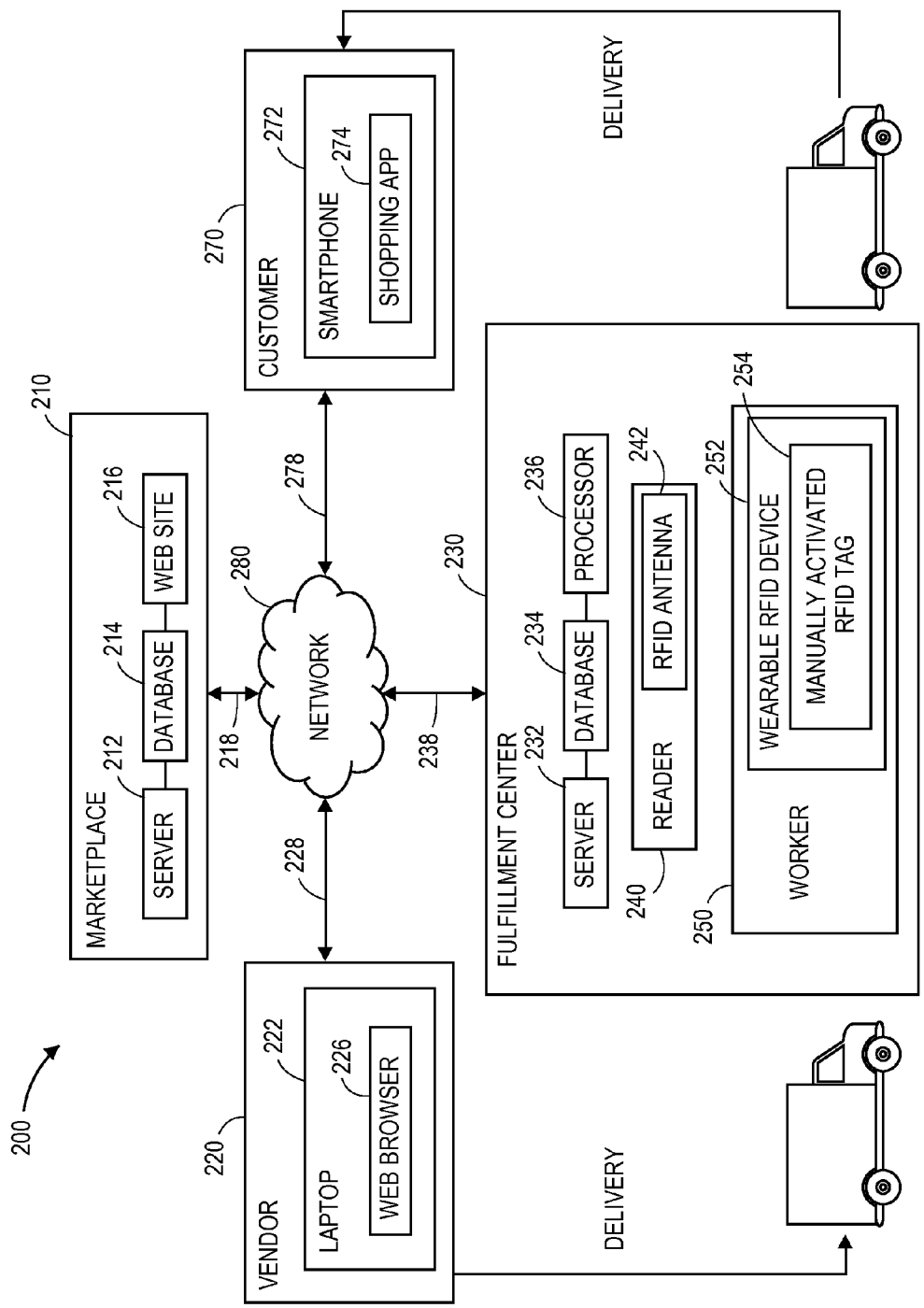
FIG. 2 is a block diagram of components of one system including a wearable RFID device in accordance with embodiments of the present disclosure.

Referring to FIG. 2, a block diagram of one system 200 including a wearable RFID device 252 having a manually activated RFID tag 254 is shown. The system 200 includes a marketplace 210, a vendor 220, a fulfillment center 230 and a customer 270 that are connected to one another across a network 280, such as the Internet.

The marketplace 210 may be any entity or individual that wishes to make items from a variety of sources available for download, purchase, rent, lease or borrowing by customers using a networked computer infrastructure, including one or more physical computer servers 212 and databases (or other data stores) 214 for hosting a web site 216. The marketplace 210 may be physically or virtually associated with one or more storage or distribution facilities, such as the fulfillment center 230. The web site 216 may be implemented using the one or more servers 212, which connect or otherwise communicate with the one or more databases 214 as well as the network 280, as indicated by line 218, through the sending and receiving of digital data. Moreover, the database 214 may include any type of information regarding items that have been made available for sale through the marketplace 210, or ordered by customers from the marketplace 210.

The vendor 220 may be any entity or individual that wishes to make one or more items available to customers, such as the customer 270, by way of the marketplace 210. The vendor 220 may operate one or more order processing and/or communication systems using a computing device such as a laptop computer 222 and/or software applications such as a web browser 226, which may be implemented through one or more computing machines that may be connected to the network 280, as is indicated by line 228, in order to transmit or receive information regarding one or more items to be made available at the marketplace 210, in the form of digital or analog data, or for any other purpose.

The vendor 220 may deliver one or more items to one or more designated facilities maintained by or on behalf of the marketplace 210, such as the fulfillment center 230. Additionally, the vendor 220 may receive one or more items from other vendors, manufacturers or sellers (not shown), and may deliver one or more of such items to locations designated by the marketplace 210, such as the fulfillment center 230, for fulfillment and distribution to customers. Furthermore, the vendor 220 may perform multiple functions. For example, the vendor 220 may also be a manufacturer and/or a seller of one or more other items, and may offer items for purchase by customers at venues (not shown) other than the marketplace 210. Additionally, items that are made available at the marketplace 210 or ordered therefrom by customers may be made by or obtained from one or more third party sources, other than the vendor 220, or from any other source (not shown). Moreover, the marketplace 210 itself may be a vendor, a seller or a manufacturer.

The fulfillment center 230 may be any facility that is adapted to receive, store, process and/or distribute items. As is shown in FIG. 2, the fulfillment center 230 includes a networked computer infrastructure for performing various computer-related functions associated with the receipt, storage, processing and distribution of such items, including one or more physical computer servers 232, databases (or other data stores) 234 and processors 236. The fulfillment center 230 may also include stations for receiving, storing and distributing items to customers, such as one or more receiving stations, storage areas and distribution stations. The fulfillment center 230 further includes at least one RFID reader 240 having an antenna 242.

The RFID reader 240 is any type of sensor or interrogator that may be provided for use in connection with signals transmitted from one or more active or passive RFID tags. The RFID reader 240 may include one or more components for transmitting or receiving signals, such as the antenna 242, as well as various circuitry components for processing and controlling the operation of the RFID reader 240. Additionally, the RFID reader 240 may communicate with RFID tags by way of any coupling modes or methods that may be known to those of ordinary skill in the pertinent arts. For example, an RFID tag may modulate one or more elements of the data stored thereon, and transmit a modulated data signal to a receiving circuit associated with the RFID reader 240. Subsequently, the RFID reader 240 may then demodulate the data signal, and provide a processed set of data derived from the data signal to the server 232 or another computer device for further processing.

Moreover, the RFID reader 240 may be configured to capture, evaluate, transmit or store any available information regarding signals received from one or more RFID tags, including information regarding any attributes of the signals, including but not limited to sensed signal strengths or intensities, angular directions or ranges to the RFID tags from which such signals were received, any differences between the strengths, intensities, angular orientations or ranges associated with two or more signals, or information or data included in the signals. Although the fulfillment center 230 of FIG. 2 includes a single RFID reader 240, those of ordinary skill in the pertinent arts will recognize that any number of RFID readers 240 may be provided throughout a fulfillment center environment, and in any number of specified stations or locations, in accordance with the present disclosure.

As is also shown in FIG. 2, the fulfillment center 230 also includes at least one worker 250 operating a wearable RFID device 252 having at least one manually activated RFID tag 254 associated therewith. The worker 250 may be any designated personnel tasked with performing one or more tasks within the fulfillment center 230, and may wear the wearable RFID device 252 during the performance of such tasks. The worker 250 may handle or transport items (e.g., any type or form of good, product, media or other tangible consumer article) within the fulfillment center 230, operate one or more pieces of equipment therein (not shown). The worker 250 may also operate one or more specific computing devices or machines for registering the receipt, retrieval, transportation or storage of items within the fulfillment center 230, or a general purpose device such a personal digital assistant, a digital media player, a smartphone, a tablet computer, a desktop computer or a laptop computer (not shown), which may include any form of input and/or output peripherals such as scanners, readers, keyboards, keypads, touchscreens or like devices.

The manually activated RFID tag 254 may be an RFID tag of any type or form that may be embedded within or applied to the wearable RFID device 252 and coupled with an RFID reader, such as the RFID reader 240, upon manual contact therewith. For example, the manually activated RFID tag 254 may be applied to the wearable RFID device 252 in the form of a label, stitched within or otherwise bound to fabric or other materials of the wearable RFID device 252, or otherwise embedded within or formed from one or more layers or components of the wearable RFID device 252. As is discussed above, the manually activated RFID tag 254 may be programmed with any relevant information or data relating to the wearable RFID device 252, the worker 250 or any relevant objects, humans, machines or structures within the fulfillment center 230, and may be configured to transmit such information or data upon a coupling with an RFID reader.

The fulfillment center 230 may operate one or more order processing and/or communication systems using computer devices in communication with one or more of the server 232, the database 234 and/or the processor 236, or through one or more other computing devices or machines that may be connected to the network 280, as is indicated by line 238, in order to transmit or receive information in the form of digital or analog data, or for any other purpose. Such computer devices may also operate or provide access to one or more reporting systems for receiving or displaying information or data regarding workflow operations, and may provide one or more interfaces for receiving interactions (e.g., text, numeric entries or selections) from one or more operators, users or workers in response to such information or data. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding the workflow operations, or the interactions received from the one or more operators, users or workers.

Additionally, as is discussed above, the fulfillment center 230 may include one or more receiving stations featuring any apparatuses that may be required in order to receive shipments of items at the fulfillment center 230 from one or more sources and/or through one or more channels, including but not limited to docks, lifts, cranes, jacks, belts or other conveying apparatuses for obtaining items and/or shipments of items from carriers such as cars, trucks, trailers, freight cars, container ships or cargo aircraft (e.g., manned aircraft or unmanned aircraft, such as drones), and preparing such items for storage or distribution to customers. The fulfillment center 230 may also include one or more predefined two-dimensional or three-dimensional storage areas including facilities, such as the storage facility 164 of FIGS. 1A and 1B, for accommodating items and/or containers of such items, such as aisles, rows, bays, shelves, slots, bins, racks, tiers, bars, hooks, cubbies or other like storage means, or any other appropriate regions or stations. The fulfillment center 230 may further include one or more distribution stations where items that have been retrieved from a designated storage area may be evaluated, prepared and packed for delivery from the fulfillment center 230 to addresses, locations or destinations specified by customers, also by way of carriers such as cars, trucks, trailers, freight cars, container ships or cargo aircraft (e.g., manned aircraft or unmanned aircraft, such as drones).

Moreover, the fulfillment center 230 may further include one or more control systems that may generate instructions for conducting operations at the fulfillment center 230, and may be in communication with the RFID reader 240, the worker 250, or the various storage facilities and other components of the fulfillment center 230. Such control systems may also be associated with one or more other computing devices or machines, and may communicate with the marketplace 210, the vendor 220 or the customer 270 over the network 280, as indicated by line 238, through the sending and receiving of digital data.

The customer 270 may be any entity or individual that wishes to download, purchase, rent, lease, borrow or otherwise obtain items (e.g., goods, products, services or information of any type or form) from the marketplace 210. The customer 270 may utilize one or more computing devices, such as a smartphone 272 or any other like machine that may operate or access one or more software applications, such as a web browser (not shown) or a shopping application 274, and may be connected to or otherwise communicate with the marketplace 210, the vendor 220 or the fulfillment center 230 through the network 280, as indicated by line 278, by the transmission and receipt of digital data. Moreover, the customer 270 may also receive deliveries or shipments of one or more items from facilities maintained by or on behalf of the marketplace 210, such as the fulfillment center 230, or from the vendor 220.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Those of ordinary skill in the pertinent arts will understand that process steps described herein as being performed by a "marketplace," a "vendor," a "fulfillment center," a "worker," or a "customer," or like terms, may be automated steps performed by their respective computer systems, or implemented within software modules (or computer programs) executed by one or more general purpose computers. Moreover, process steps described as being performed by a "marketplace," a "vendor," a "fulfillment center," a "worker," or a "customer" may be typically performed by a human operator, but could, alternatively, be performed by an automated agent.

The marketplace 210, the vendor 220, the fulfillment center 230, the worker 250, and/or the customer 270 may use any web-enabled or Internet applications or features, or any other client-server applications or features including electronic mail (or E-mail), or other messaging techniques, to connect to the network 280 or to communicate with one another, such as through short or multimedia messaging service (SMS or MMS) text messages. For example, the server 232 may be adapted to transmit information or data in the form of synchronous or asynchronous messages from the fulfillment center 230 to the server 212, the laptop computer 222, a desktop computer, the smartphone 272 or any other computer device in real time or in near-real time, or in one or more offline processes, via the network 280. Those of ordinary skill in the pertinent art would recognize that the marketplace 210, the vendor 220, the fulfillment center 230, the worker 250 or the customer 270 may operate any of a number of computing devices that are capable of communicating over the network 280, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the server 212, the laptop computer 222, the server 232, or the smartphone 272, or any other computers or control systems utilized by the marketplace 210, the vendor 220, the fulfillment center 230, the worker 250 or the customer 270 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although some of the embodiments disclosed herein reference the use of wearable RFID devices having one or more manually activated RFID tags in a fulfillment center environment, as well as the use of other RFID tags that are mounted to items or associated with equipment (e.g., item carriers or storage facilities) within the fulfillment center environment, the systems and methods are not so limited.

Rather, the systems and methods disclosed herein may be utilized in any environment in which information regarding a physical transaction involving multiple discrete actors or entities must be captured, evaluated or stored, and are particularly useful in environments in which such information must be captured, evaluated or stored relatively quickly, and with a high degree of accuracy, including but not limited to environments in which traditional power supplies are not reliable or may not be readily accessed.

As is discussed above, the systems and methods of the present disclosure are directed to wearable RFID devices including one or more manually activated RFID tags, and the use of such wearable RFID devices during the performance of one or more tasks. Specifically, some embodiments of the systems and methods disclosed herein may operate based on signals received by an RFID reader from wearable RFID devices, alone or in concert with one or more other RFID signals received from other RFID tags, transmitters or devices, e.g., at the same time, or within a predetermined time interval of one another, or in a defined order or sequence, and may capture and store information regarding such signals or automatically perform one or more actions in response to the information. For example, when such signals, confluences of signals, or sequences of signals or confluences are received, a transaction may be defined, and information regarding the transaction may be captured and stored in at least one data store, and a computer-based task may be performed based on such information.

Figure 3:
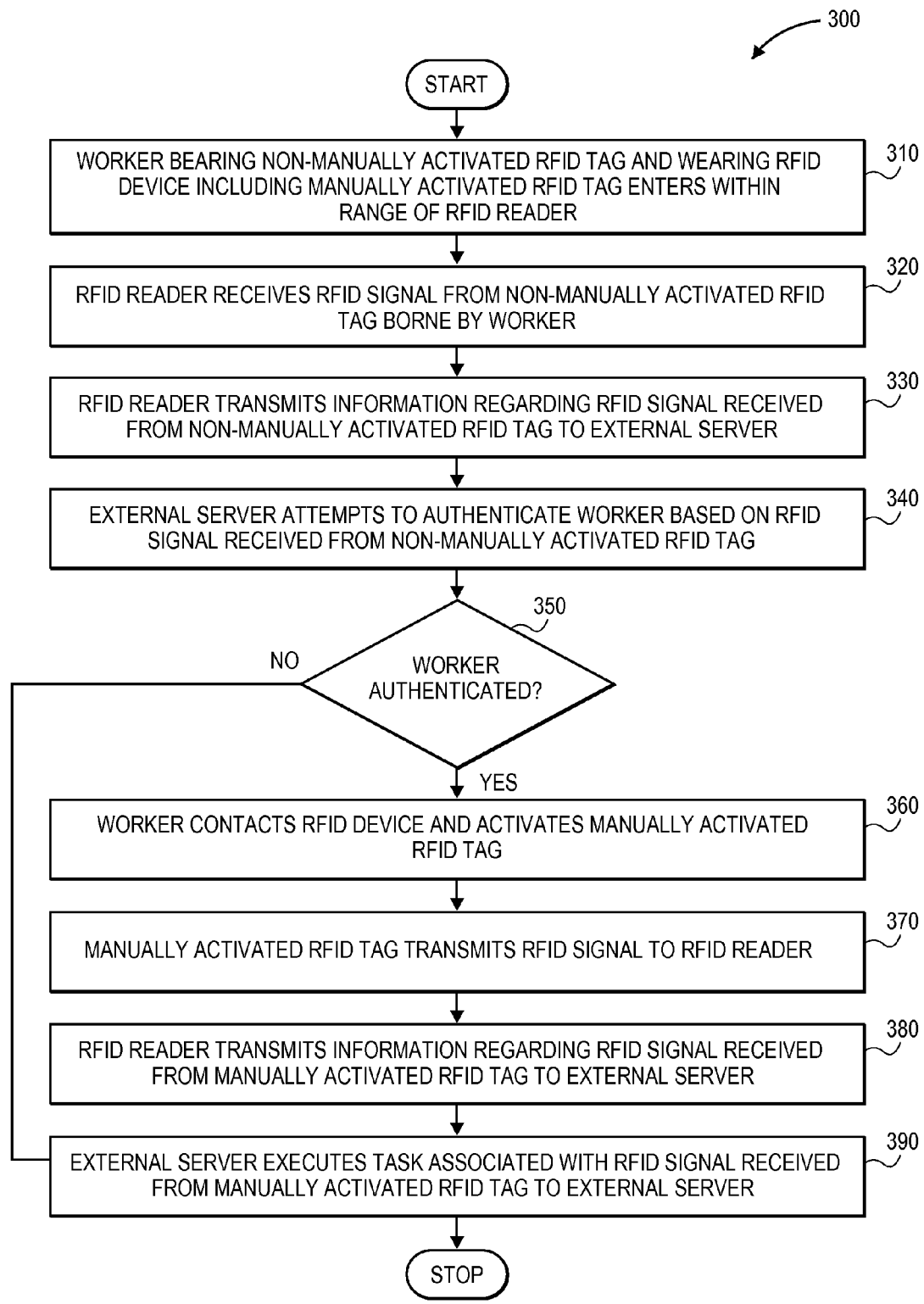
FIG. 3 is a flow chart of one process for operating a system including a wearable RFID device in accordance with embodiments of the present disclosure.

Referring to FIG. 3, a flow chart 300 representing one embodiment of a process for operating a system including a wearable RFID device in accordance with embodiments of the present disclosure is shown. At box 310, a worker bearing a non-manually activated RFID tag and wearing an RFID device that includes a manually activated RFID tag enters within a predetermined range of an RFID reader. For example, referring to FIG. 1A, the worker 150 may approach the RFID reader 140 with an identification badge having one or more passive RFID tags associated therewith on his or her person, while wearing the wearable RFID device 152.

At box 320, the RFID reader receives an RFID signal from the non-manually activated RFID tag borne by the worker. For example, a passive RFID tag may be configured to transmit an RFID signal identifying the worker, or a task being performed by the worker, upon entering within the predetermined range of the RFID reader. At box 330, the RFID reader transmits information regarding the RFID signal received from the non-manually activated RFID tag to an external server, and at box 340, the external server attempts to authenticate the worker based on the RFID signal. For example, where the RFID signal transmitted by the non-manually activated RFID tag includes a unique identifier of the worker, the external server or another networked component may, upon receiving information from the RFID reader, viz., the unique identifier, attempt to not only identify the worker but also determine a level of clearance or authorization of information that the worker may be permitted to access, or of tasks that the worker may be authorized to perform.

At box 350, the system determines whether the worker has been authenticated based on the RFID signal. If the worker is not authenticated, then the process ends. However, if the worker has been authenticated, then the process advances to box 360, where the worker contacts the wearable RFID device, and activates the manually activated RFID tag associated therewith, and to box 370, where an RFID signal is transmitted to the RFID reader. For example, the worker may contact a touch-sensing button on the wearable RFID device and cause capacitive or conductive elements within the manually activated RFID tag to close a circuit and transmit a predetermined data signal to the RFID reader. The predetermined data signal may be persistently transmitted as long as the wearable RFID device is within range of the RFID reader, and until the contact is removed.

At box 380, the RFID reader transmits information regarding the RFID signal received from the manually activated RFID tag to an external server or another networked component. The information transmitted may include, but is not limited to, the information or data included in the RFID signal, as well as any attributes of the RFID signal, including but not limited to a sensed signal strength or intensity or an angular direction or range to the wearable RFID device. For example, the information may identify a positive action taken or instruction provided by the worker based on the contact of the wearable RFID device and the initiation of the transmission of an RFID signal from the manually activated RFID tag to the RFID reader. Such information may be stored in at least one data store, or otherwise affiliated with the worker or the RFID reader, or one or more other objects, humans, machines or structures in a vicinity of the worker or the RFID reader.

At box 390, the external server executes a task associated with the RFID signal received from the manually activated RFID tag, and the process ends. The external server may identify a relevant task requiring a positive action or instruction by the worker in a vicinity of the RFID reader, and may execute the relevant task upon identifying the information received from the RFID reader. For example, the task may relate to stowing or retrieving an item in a storage facility, such as the storage facility 164 of FIGS. 1A and 1B, as well as opening of a locked door or vault, accessing confidential or other secured information, or performing any other task that may require both authentication of a worker and a positive action or instruction from the worker.

Accordingly, the systems and methods of the present disclosure may provide a powerless, wearable device for communicating information regarding an action or an instruction provided by a user, without requiring physical contact between a transmitter associated with the user and a receiver, and cause the performance of one or more tasks upon identifying the user and receiving the information regarding the action or the instruction. Although the process represented in the flow chart 300 of FIG. 3 contemplates identifying or authenticating the worker based at least in part on an RFID signal received from a non-manually activated RFID tag, those of ordinary skill in the pertinent art will recognize that the systems and methods disclosed herein are not so limited, and that any other system or manner for identifying or authenticating a worker may be utilized in accordance with the present disclosure.

Figure 4A:
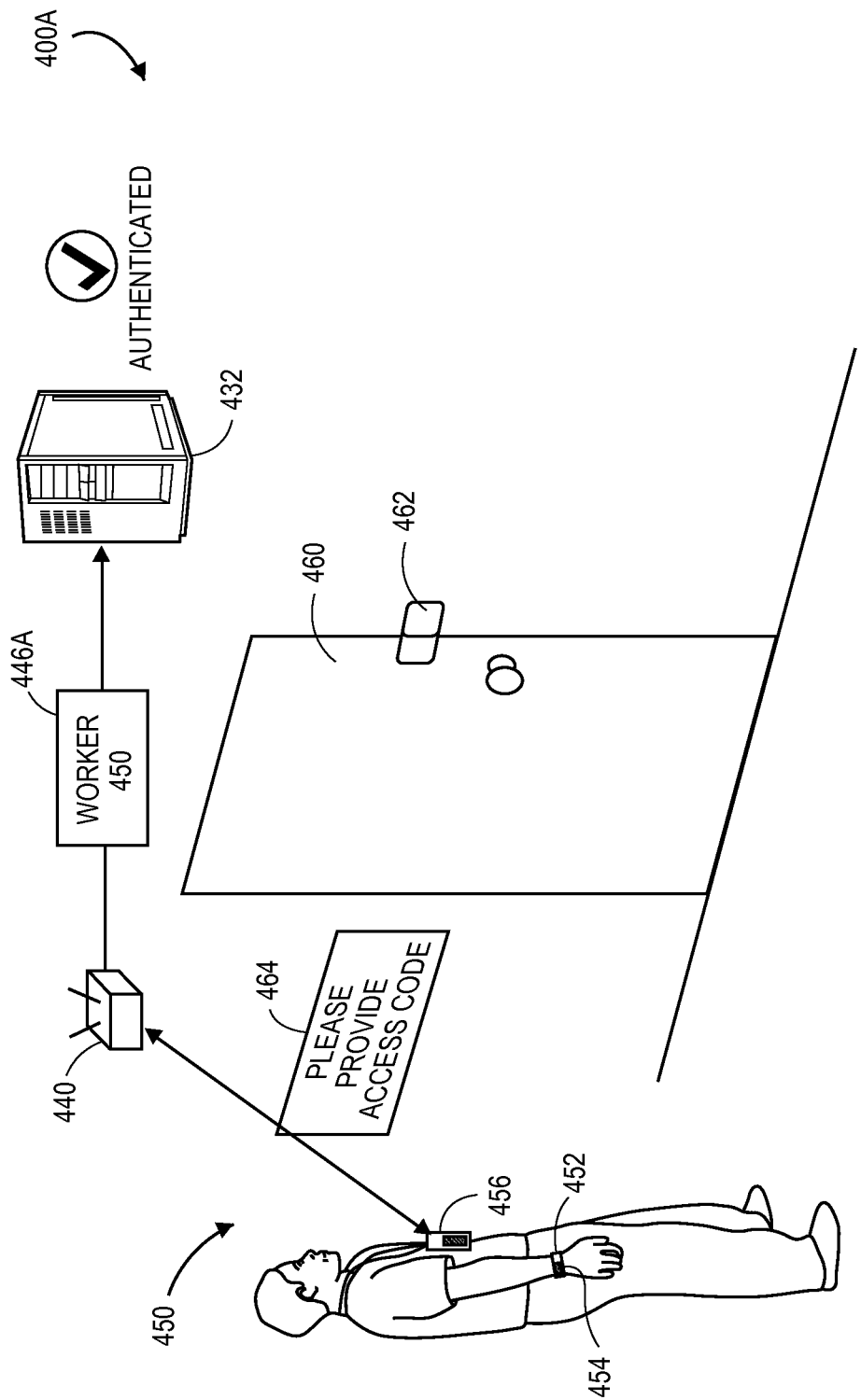
FIGS. 4A and 4B are views of one system including a wearable RFID device in accordance with embodiments of the present disclosure.
Figure 4B:
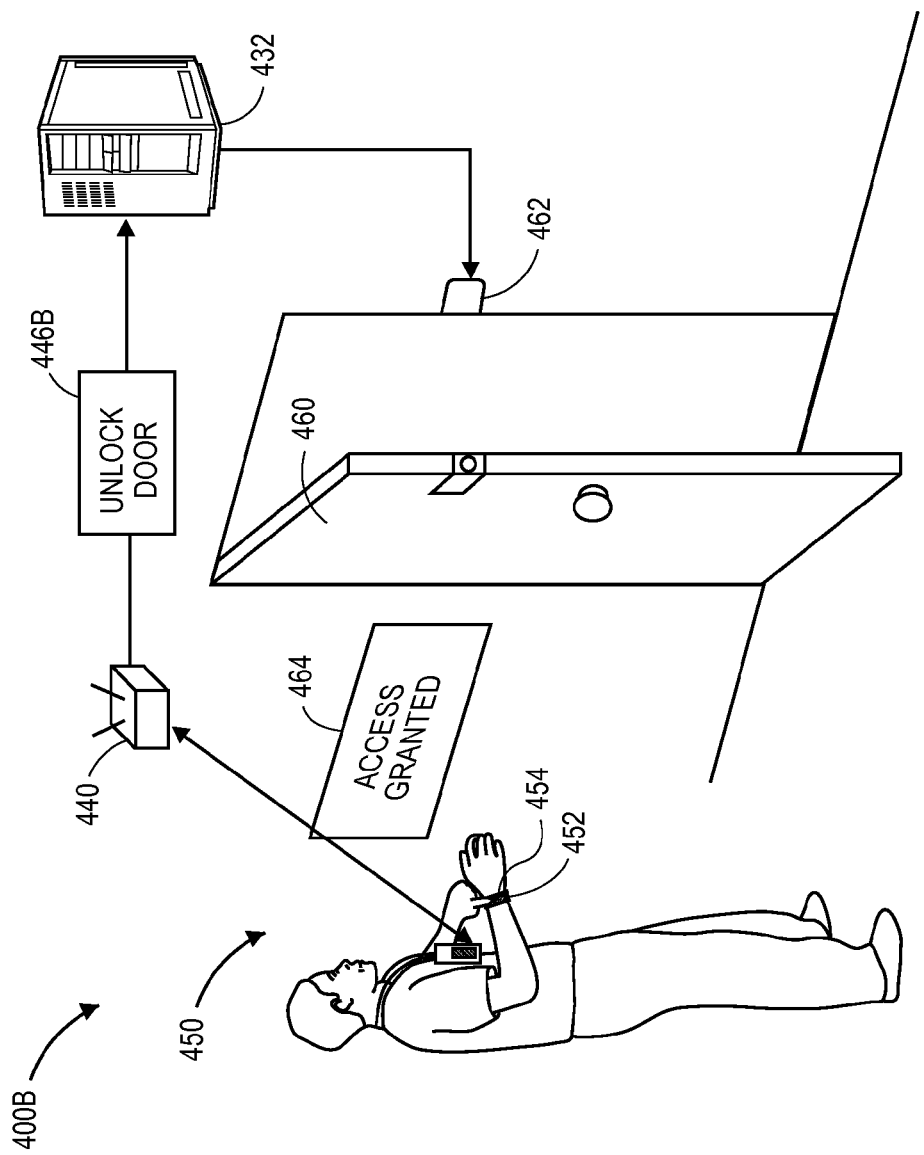

The systems and methods of the present disclosure may utilize wearable RFID devices for the performance of any task requiring a direct action or instruction from a user. Referring to FIGS. 4A and 4B, a system 400 including a wearable RFID device 452 in accordance with embodiments of the present disclosure is shown. As is shown in FIG. 4A, the system 400A includes a server 432, an RFID reader 440, a worker 450, a doorway 460 secured with a lock 462 and an electronic display screen 464. The worker 450 is wearing an identification badge 456 having a passive RFID tag incorporated therewith, as well as the wearable RFID device 452 on his or her right wrist. The wearable RFID device 452 shown in FIG. 4A is in the form of a bracelet and includes a manually activated RFID tag 454 that may be embedded in or otherwise associated therein. The electronic display screen 464 indicates that the worker 450 must present credentials in order to traverse the doorway 460.

As is shown in FIG. 4A, the worker 450 may be identified on any basis, including but not limited to an RFID signal transmitted from the identification badge 456 to the RFID reader 440. Upon receiving the RFID signal, the RFID reader 440 may transmit information 446A identifying the worker 450 to the server 432, or to another networked component (not shown).

As is discussed above, the systems and methods of the present disclosure may be used to receive information regarding a direct action taken or instruction provided by a user of a wearable RFID device, such as the worker 450 of FIG. 4A, in a vicinity of an RFID reader. Referring to FIG. 4B, the system 400B is shown with the worker 450 contacting a touch-sensing button on the wearable RFID device 452 and/or the manually activated RFID tag 454. The contact with the wearable RFID device 452 causes an RFID signal to be transmitted from the manually activated RFID tag 454 to the RFID reader 440, which in turn transmits information 446B regarding the worker 450 in the form of an instruction to open the doorway 460 to the server 432. Upon receiving the information 446B, the server 432 causes the lock 462 to be released, and the doorway 460 to be opened. Additionally, the server 432 may further cause the electronic display screen 464 to indicate that the worker 450 is authorized to enter the doorway 460.

Therefore, the systems and methods of the present disclosure may be used to identify a user, to receive an instruction from the user, and to take one or more actions relating to a task in response to the instruction. The user may be identified, and the instruction may be received from a wearable RFID device worn by the user, which may securely transmit the instruction to an RFID reader in a fast and efficient manner, without requiring a connection to a traditional power source.

Figure 5:
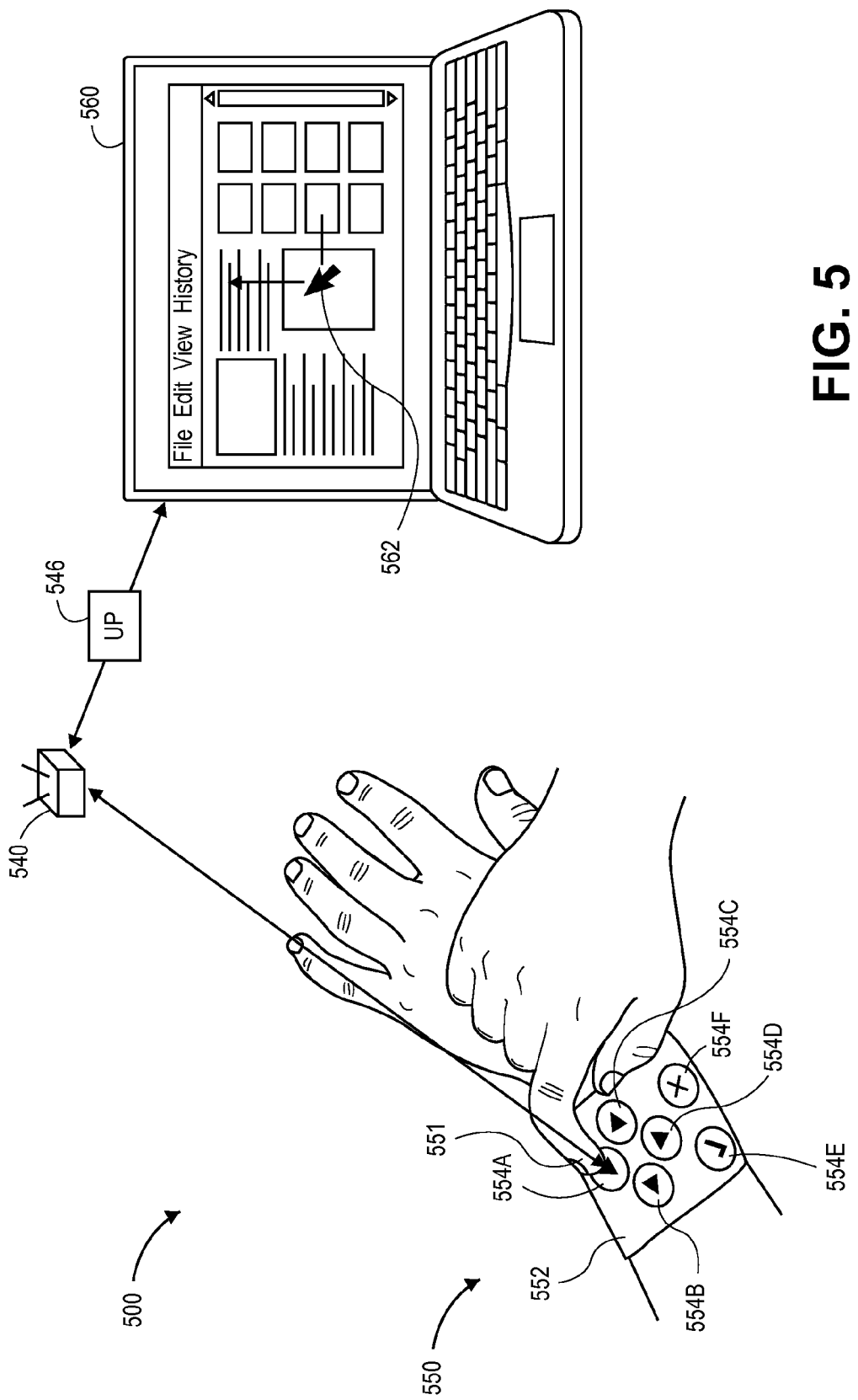
FIG. 5 is a view of one system including a wearable RFID device in accordance with embodiments of the present disclosure.

Those of ordinary skill in the pertinent art will recognize that the applications of the wearable RFID devices of the present disclosure, and the aspects or extensions of a human body about which the wearable RFID devices may be worn, are not limited. For example, according to some embodiments, a wearable RFID device may be used to operate a pointing device in a browser or other computer-based application. Referring to FIG. 5, a system 500 including a wearable RFID device 552 in accordance with embodiments of the present disclosure is shown. The system 500 includes a worker 550 wearing the wearable RFID device 552, which is in the form of a wristband, an RFID reader 540 and a computer 560. The wearable RFID device 552 includes a plurality of touch-sensing buttons 554A, 554B, 554C, 554D, 554E, 554F. The touch-sensing buttons 554A, 554B, 554C, 554D include markings thereon which correspond to directions (e.g., up, down, left and/or right), while the touch-sensing buttons 554E, 554F include markings which correspond to a positive action, viz., a "check," and a negative action, viz., an "X," respectively.

As is shown in FIG. 5, when the worker 550 contacts a portion of the wearable RFID device 552 corresponding to the touch-sensing button 554A using a finger 551, an RFID signal is transmitted from the wearable RFID device 552 to the RFID reader 540, which in turn transmits information 546 regarding the signal, viz., a direction associated with the touch-sensing button 554A, to the computer 560 or to another networked component (not shown). Subsequently, a pointer 562 on a display of the computer 560 is caused to move in an upward direction, based on the contact with the touch-sensing button 554A on the wearable RFID device 552. Therefore, even in the absence of power and in view of a lack of physical, electrical or functional contact with the computer 560, the wearable RFID device 552 permits the worker 550 to operate the computer 560 by way of the pointer 562. For example, the worker 550 may continue to contact touch-sensing buttons 554A, 554B, 554C, 554D using the finger 551 or another digit to move the pointer 562 to one or more various locations across the display of the computer 560, and may contact the touch-sensing button 554E to take an action based on the location of the pointer 562, or the touch-sensing button 554F to cancel such an action.

Figure 6:
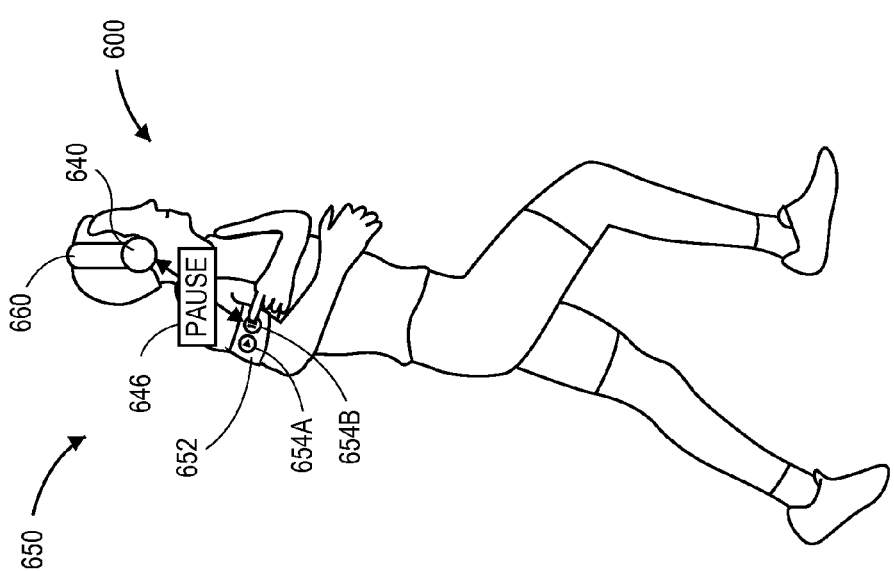
FIG. 6 is a view of one system including a wearable RFID device in accordance with embodiments of the present disclosure.

Similarly, referring to FIG. 6, a system 600 including a wearable RFID device 652 in accordance with embodiments of the present disclosure is shown. The system 600 includes a jogger 650 wearing the wearable RFID device 652 (viz., an armband) and a pair of RFID-enabled headphones 660 having an RFID reader 640 associated therewith. The wearable RFID device 652 includes a pair of manually activated RFID tags 654A, 654B for controlling the playing of media on the headphones 660. As is shown in FIG. 6, when the jogger 650 contacts a touch-sensing button of the wearable RFID device 652 corresponding to the manually activated RFID tag 654B that is configured to pause the playing of media on the headphones 660, an RFID signal 646 is transmitted to the RFID reader 640 on the headphones 660, and the playing of the media on the headphones 660 is paused accordingly. Thus, the jogger 650 can control the operation of the headphones 660 using a device that does not require any form of independent power source (e.g., a battery) and is not directly connected to the headphones 660, thereby limiting any restrictions on the ranges of motion of the jogger 650 while exercising.

Figure 7:
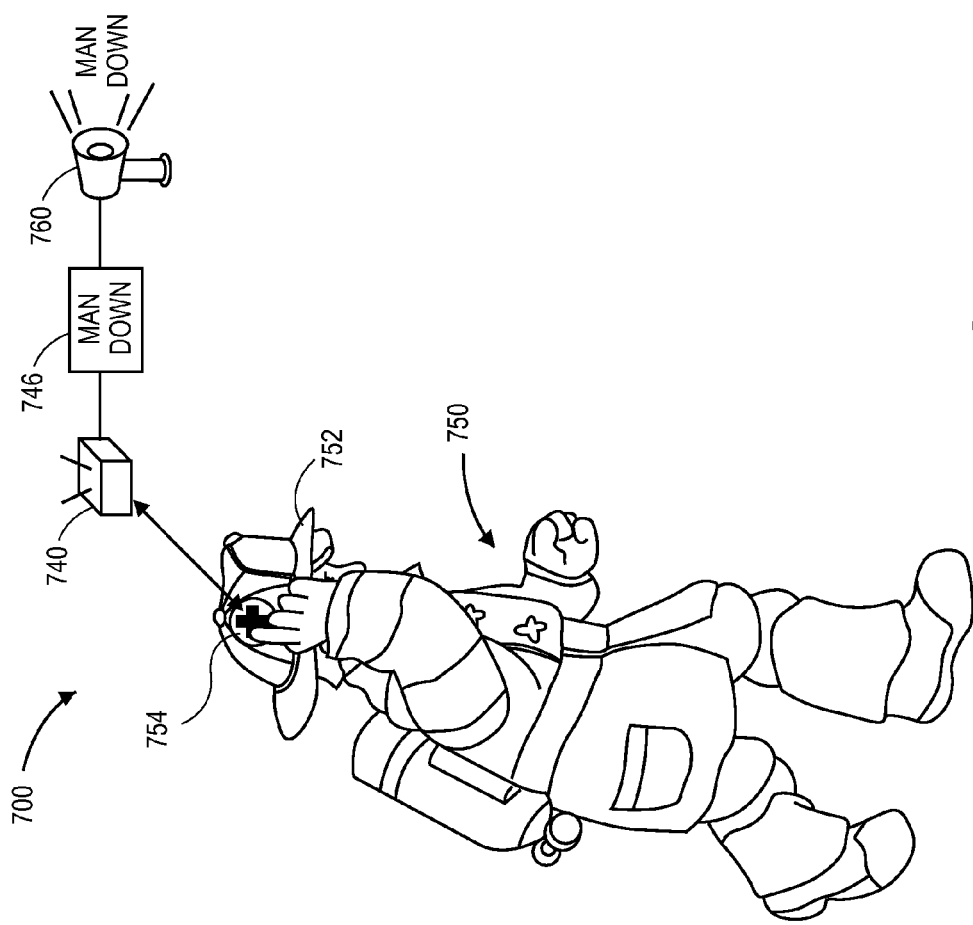
FIG. 7 is a view of one system including a wearable RFID device in accordance with embodiments of the present disclosure.

Referring to FIG. 7, a system 700 including a wearable RFID device 752 in accordance with embodiments of the present disclosure is shown. The system 700 includes a first responder 750 (viz., a firefighter) wearing the wearable RFID device 752 (viz., a firefighting helmet), which includes a touch-sensing button corresponding to a manually activated RFID tag 754 that is provided for the purpose of calling for assistance. When the first responder 750 contacts the touch-sensing button corresponding to the manually activated RFID tag 754, an RFID signal is transmitted to an RFID reader 740, which causes a signal 746 to be played from a speaker 760. Thus, where the first responder 750 is in a vicinity of an RFID reader, such as the RFID reader 740, he or she may signal his or her need for assistance simply by contacting a touch-sensing button associated with a manually activated RFID tag 754 provided on his or her helmet 752, which may issue an audible call for help without requiring any power or functional connection between the first responder 750 and the speaker 760.

As is also discussed above, the wearable RFID devices of the present disclosure may be independently and automatically configured to transmit or otherwise provide information regarding actions or instructions by a worker based on contact with one or more manually activated RFID tags. For example, although a manually activated RFID tag may be configured to transmit a unique RFID signal, an RFID reader that is associated with a particular task or function may interpret the unique RFID signal received from the RFID reader in a manner that is tailored to the purpose or function with which the RFID reader may be associated. Thus, a worker who contacts a touch-sensing button on a wearable RFID device that is associated with an "OFF" command may halt the operation of a piece of machinery, isolate flow through a valve or secure power to an electrical device in a powerless manner, so long as the piece of machinery, the valve or the electrical device are associated with one or more RFID readers that are configured to receive an RFID signal from the wearable RFID device and to transmit one or more instructions regarding their respective operations.

Figure 8:
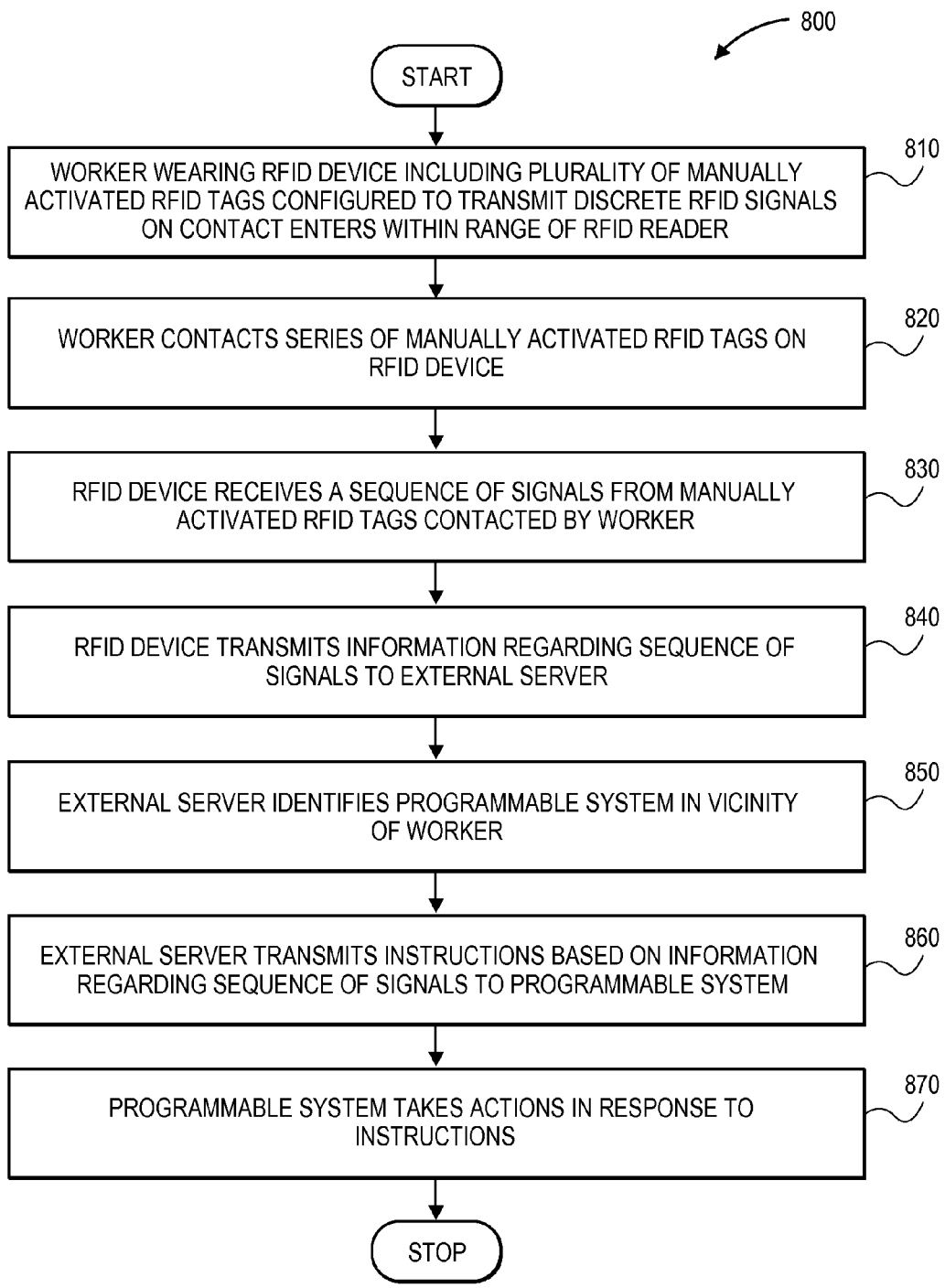
FIG. 8 is a flow chart of one process for operating a system including a wearable RFID device in accordance with embodiments of the present disclosure.

Referring to FIG. 8, a flow chart 800 representing one embodiment of a process for operating a system including a wearable RFID device in accordance with embodiments of the present disclosure is shown. At box 810, a worker wearing an RFID device that includes a plurality of manually activated RFID tags configured to transmit discrete RFID signals on contact enters within a range of an RFID reader. For example, the RFID device may include one or more of the "STOW" manually activated RFID tag 154 of FIGS. 1A, 1B and 1C, the manually activated RFID tags 554A, 554B, 554C, 554D, 554E, 554F for engaging in directional or operational control of FIG. 5, the manually activated RFID tags 654A, 654B for operating the headphones 660 of FIG. 6, or the manually activated RFID tag 754 for requesting assistance of FIG. 7, or any other manually activated RFID tags configured to transmit a particular RFID signal, in accordance with the present disclosure. At box 820, the worker contacts a series of the manually activated RFID tags on the RFID device, and at box 830, the RFID reader receives a sequence of signals from the manually activated RFID tags contacted by the worker.

At box 840, the RFID reader transmits information regarding the sequence of signals received at box 830 to an external server or to another networked component. For example, where the RFID reader receives a confluence of two or more RFID signals simultaneously or nearly simultaneously, or a sequence of RFID signals or confluences of such signals, information regarding such signals, confluences or sequences, e.g., intensities or frequencies of the RFID signals, as well as times at which such signals were received, or the contents of such signals themselves, may be transferred to a server for analysis. At box 850, the external server identifies a programmable system in a vicinity of the worker. For example, the external server may identify a location of the RFID reader and determine which programmable systems are located near the RFID reader.

At box 860, the external server transmits instructions based on the information regarding the sequence of signals to the programmable system. For example, if the RFID signals transmitted on contact with the manually activated RFID devices are associated with a directional command (e.g., up, down, left and/or right) or an operational command (e.g., on, off, stow, retrieve), the external server may define a meaning of the directional or operational command associated with the programmable system identified at box 850, and may transmit one or more instructions that are consistent with the directional or operational command to the programmable system identified at box 860. At box 870, the programmable system takes one or more actions in response to the instructions, and the process ends.

Figure 9:
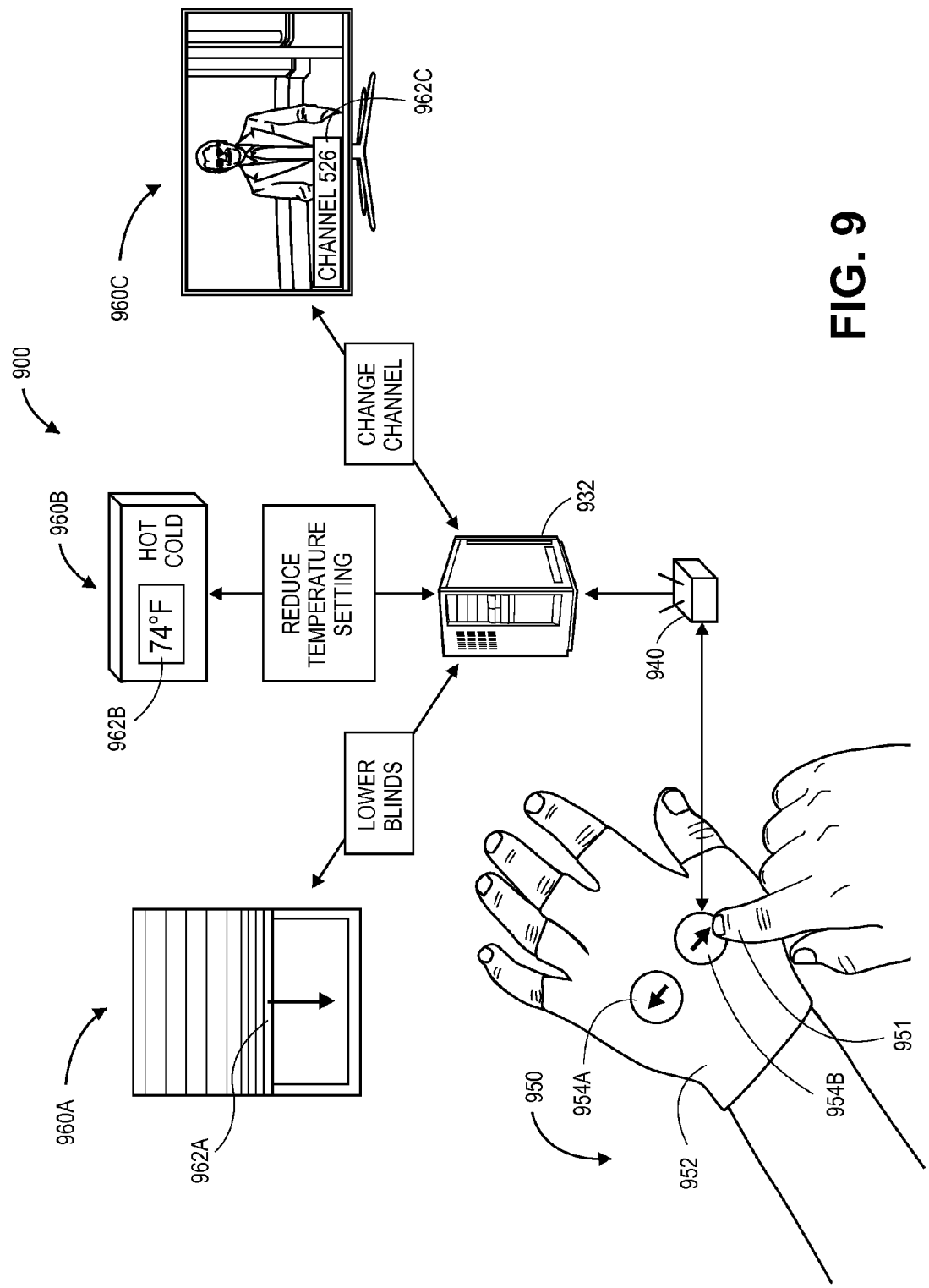
FIG. 9 is a view of one system including a wearable RFID device in accordance with embodiments of the present disclosure.

The interoperability of the wearable RFID devices of the present disclosure for use with multiple programmable systems may be shown with regard to FIG. 9. Referring to FIG. 9, a system 900 including a wearable RFID device 952 in accordance with embodiments of the present disclosure is shown. The system 900 includes a server 932, an RFID reader 940, and a user 950 wearing the wearable RFID device 952. The server 932 is in communication with three discrete subsystems 960A, 960B, 960C (viz., powered window system, electronic thermostat, flat panel television). The wearable RFID device 952 includes two touch-sensing buttons associated with manually activated RFID tags 954A, 954B for transmitting RFID signals consistent with directional commands (e.g., up and down).

As is shown in FIG. 9, the user may utilize the wearable RFID device 952 in order to independently control the operation of each of the subsystems 960A, 960B, 960C. For example, when the user 950 contacts a touch-sensing button associated with the manually activated RFID tag 954B with a finger 951, thereby transmitting an RFID signal associated with a downward directional command to the server 932, the server 932 may select one of the subsystems 960A, 960B, 960C on any basis, and transmit a corresponding instruction to the selected one of the subsystems 960A, 960B, 960C. For example, where the server 932 sends such instructions to the subsystem 960A, viz., the powered window system, a blind 962A may be lowered in response to the instructions. Where the server 932 sends such instructions to the subsystem 960B, viz., the electronic thermostat, a temperature setting 962B may be reduced. Where the server 932 sends such instructions to the subsystem 960C, viz., the flat panel television, the channel 962C may be changed to a channel having the immediately lower number.

Accordingly, some embodiments of the wearable RFID devices of the present disclosure are versatile components for transmitting instructions to one or more networked systems or components without requiring physical, wired connections between the RFID devices and traditional power sources or an RFID reader configured to receive such instructions. The wearable RFID devices are configured to transmit unique RFID signals to one or more RFID readers, which may provide information regarding such signals to an external server or other computer device. The external server or computer device may identify a programmable system within a vicinity of the wearable RFID device, and may transmit instructions to the programmable system that are consistent with the RFID signals received by the one or more RFID readers.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure. For example, although some of the embodiments of the present disclosure are shown as being utilized in a fulfillment center environment, e.g., wearable RFID devices worn by workers at a fulfillment center, or on objects, machines or structures within the fulfillment center, the systems and methods disclosed herein are not so limited, and may be provided in connection with objects, humans, machines or structures in any environment.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIGS. 3 and 8, the order in which the boxes or steps of the methods or processes are listed is not intended to be construed as a limitation on the claimed inventions, and any number of the boxes or steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or boxes or steps. In a similar manner, terms such as "include," "including" and "includes are generally intended to mean "including, but not limited to." Thus, such conditional language is not generally intended to imply that features, elements and/or boxes or steps are in any way required for one or more embodiments or that one or more embodiments necessarily include logic for deciding, with or without user input or prompting, whether these features, elements and/or boxes or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A computer system comprising:
an RFID reader;
a wearable RFID device comprising an article of clothing, a manually activated RFID tag disposed on an outer surface of the article of clothing and a protective layer provided over the manually activated RFID tag, wherein the manually activated RFID tag comprises a circuit having open elements that may be closed by bioelectricity upon contact with the protective layer; and
a computing device in communication with at least the RFID reader,
wherein the computing device is configured to at least:
identify a wearer of the wearable RFID device;
identify an item in a vicinity of the wearable RFID device;
generate an instruction for performing a task, wherein the task comprises a placement of the item in a storage facility;
transmit the instruction for performing the task to at least one networked component;
receive, at the RFID reader, a first RFID signal from the manually activated RFID tag, wherein the first RFID signal is transmitted upon contact with the protective layer provided over the manually activated RFID tag by the wearer at a first time; and
store, after receiving the first RFID signal from the manually activated RFID tag, information regarding at least the wearer, the item and the task in at least one data store, wherein the information comprises an acknowledgment of the placement of the item in the storage facility by the wearer.

2. The computer system of claim 1, wherein the computing device is further configured to at least:
receive, at the RFID reader, a second RFID signal from at least one non-manually activated RFID tag associated with the wearer,
wherein the wearer of the wearable RFID device is identified based at least in part on the second RFID signal.

3. The computer system of claim 1, wherein the task further comprises at least one of:
recording information regarding the item in at least one registry;
authenticating the wearer;
activating a setting associated with at least one of the item, the task or the wearer; or
deactivating the setting associated with the at least one of the item, the task or the wearer.

4. The computer system of claim 1, wherein the article of clothing is at least one of:
a glove-like apparatus;
a bracelet-like apparatus; or
an apparatus configured to be worn about at least a portion of an arm, a leg or a head of the wearer.

5. A method comprising:
receiving, at an RFID reader, a first RFID signal transmitted from a wearable RFID device comprising at least one manually activated RFID tag having a circuit configured to be closed by bioelectricity, wherein the first RFID signal is transmitted by the at least one manually activated RFID tag upon contact with at least a portion of the wearable RFID device by a user;
identifying at least one of the user of the wearable RFID device or an object in a vicinity of the wearable RFID device;
storing information regarding the first RFID signal and at least one of the user or the object by at least one computing device; and
identifying at least one task associated with the at least one of the user of the wearable RFID device or the object in the vicinity of the wearable RFID device based at least in part on the information,
wherein the at least one task comprises a placement of the object in a storage facility by the user, and
wherein the information comprises an acknowledgment of the placement of the object in the storage facility by the user.

6. The method of claim 5, wherein the wearable RFID device comprises at least one protective layer over the at least one manually activated RFID tag, and
wherein the first RFID signal is transmitted by the at least one manually activated RFID tag upon contact with the at least one protective layer by the user.

7. The method of claim 5, further comprising:
providing at least one instruction for performing the at least one task to a networked component associated with the task.

8. The method of claim 7, further comprising:
identifying a plurality of networked components in communication with the at least one computing device, wherein each of the networked components is associated with at least one of a plurality of tasks; and
selecting at least one of the plurality of networked components based at least in part on the first RFID signal,
wherein the at least one instruction for performing the at least one task is provided to the selected one of the plurality of networked components.

9. The method of claim 5, wherein identifying the at least one of the user of the wearable RFID device or the object in the vicinity of the wearable RFID device comprises:
receiving, at the RFID reader, a second RFID signal transmitted from a first RFID device comprising at least one RFID tag; and
associating the second RFID signal with the at least one of the user of the wearable RFID device or the object in the vicinity of the wearable RFID device, wherein the at least one of the user of the wearable RFID device or the object is identified based at least in part on the second RFID signal.

10. The method of claim 9, further comprising:
authenticating the user based at least in part on at least one of the first RFID signal or the second RFID signal,
wherein the information regarding the first RFID signal and at least one of the user or the object comprises an authentication of the user.

11. A method comprising:
receiving, at an RFID reader, a first RFID signal transmitted from a wearable RFID device comprising at least one manually activated RFID tag having a circuit configured to be closed by bioelectricity, wherein the first RFID signal is transmitted by the at least one manually activated RFID tag upon contact with at least a portion of the wearable RFID device by a user;
receiving, at the RFID reader, a second RFID signal transmitted from a first RFID device comprising at least one RFID tag;
associating the second RFID signal with the at least one of the user of the wearable RFID device or an object in a vicinity of the wearable RFID device;
identifying at least one of the user of the wearable RFID device or the object in the vicinity of the wearable RFID device based at least in part on the second RFID signal;
determining a location of the object based at least in part on the first RFID signal or the second RFID signal;
storing information regarding the first RFID signal and the at least one of the user of the wearable RFID device or the object by at least one computing device, wherein the information regarding the first RFID signal and at least one of the user or the object comprises the location of the object; and
identifying at least one task associated with the at least one of the user of the wearable RFID device or the object in the vicinity of the wearable RFID device based at least in part on the information.

12. The method of claim 5, wherein the wearable RFID device is configured to be worn about at least one of a hand, a wrist, an arm, a leg, a waist or a head of the user.

13. The method of claim 5, wherein the wearable RFID device comprises a plurality of manually activated RFID tags,
wherein each of the plurality of manually activated RFID tags comprises a circuit configured to be closed by bioelectricity, and
wherein each of the plurality of manually activated RFID tags is configured to transmit at least one unique RFID signal upon contact with at least one unique portion of the wearable RFID device by the user.

14. The method of claim 13, wherein at least one of the plurality of manually activated RFID tags comprises a touch-sensing button, and
wherein the wearable RFID device is configured to transmit the at least one unique RFID signal upon contact with the touch-sensing button by the user.

15. The method of claim 14, wherein the touch-sensing button is located on a portion of the wearable RFID device corresponding to a dorsal side of a hand of the user.

* * * * *